MEANS TO SELECTIVELY ACTIVATE SEPARATE RECORDING CHANNELS

Filed March 15, 1965

INVENTOR.
JAMES H. GERDING

BY John J. McCormack

ATTORNEY.

MEANS TO SELECTIVELY ACTIVATE SEPARATE RECORDING CHANNELS

Filed March 15, 1965

INVENTOR.
JAMES H. GERDING
BY John J. McCormack
ATTORNEY.

United States Patent Office 3,426,338
Patented Feb. 4, 1969

3,426,338

MEANS TO SELECTIVELY ACTIVATE SEPARATE RECORDING CHANNELS

James H. Gerding, Framingham, Mass., assignor to Honeywell Inc., Minneapolis, Minn., a corporation of Delaware Filed Mar. 15, 1965, Ser. No. 439,641
U.S. Cl. 340—174.1 14 Claims
Int. Cl. G11b 5/28

The present invention relates to recording systems and more particularly to correction means for aligning recorded signals between multiple record tracks wherein individual heads in a multi-head recorder may impress record signals which deviate from a prescribed alignment.

In the art of recording, especially for data processing systems, it is common to store digital information or the like in the form of plural bit-tracks whereby bits comprising a character are aligned along a "character-column" transverse the track lengths. Such multi-track media may comprise magnetic tape, drums etc. wherein such informational bits comprise magnetic spots, the presence or absence of which in tracks along an inter-track column denotes a particular character. Thus, in instances where a predetermined number of bits must be read out simultaneously from parallel tracks to represent a single character, it is important that such bits be carefully aligned. In the computing arts there are many other instances wherein signals from a plurality of parallel tracks, or channels, must be recorded so as to be reproduced in precisely the same time relationship within tolerances on the order of a fraction of a microsecond. At times, digital signals are stored in the form of time-varying functions for later operations, the accuracy of which will depend upon the precise phase relation between the associated bits along parallel channels. In slightly different applications, a broad band signal may be broken-down into several narrower-band signals to be recorded individually on parallel tracks of magnetic tape in precise time relation. Undistorted synthesis and reproduction of the original signal by demultiplexing synthesizers, requires that the signals produced by a playback head from parallel tracks have precisely the same time relation to each other as that existing in the original signal.

Thus, in the art of recording data signals along multiple tracks of a record medium, it has become critically important to align individual heads of a multi-head multi-track recorder so as to impress data signals on individual tracks to be aligned along a common axis, that is, along a column transverse to the track direction. Of course, this problem increases with increasing bit density since the recording head must "write" within smaller and smaller column-widths and therefore present signals which are more attenuated in size and are more accurately positioned. For instance, where individual write-heads of a multi-head recorder are misaligned, they may apply data marks on their respective tracks which deviate from a prescribed column-axis so much as to be lost, or even misread (as belonging to adjacent columns). This problem of head misalignment is becoming especially critical in magnetic recording where bit density has risen to an unheard of level, crowding magnetic spots so closely so as to be almost contiguous and, accordingly, reducing the bit-size and therefore the gap-size of the head to tiny dimensions. As gap sizes decrease, gap alignment between adjacent heads becomes more critical, of course, since the smaller the bit, the easier it may wander from a reference column-axis and be "lost."

Decreasing bit sizes and other considerations have led to ever-smaller recording heads which, as a matter of practical convenience, are often assembled together with other tiny heads, for instance, being fixedly positioned relative to one another by being "potted" in a multi-head module. One common such arrangement pots a write-head and a read-head together in spaced relation. A plurality of such read-head/write-head modules is shown, for instance, in stacked relation in FIGURE 1. In such an arrangement four read-write modules are shown, comprising read-head and write-head combinations, respectively: **4*a*–6*a*; 4*b*–6*b*; 4*c*–6*c*; 4*d*–6*d*. The heads are arranged to have a prescribed gap 8 of tiny dimensions and assembled together to comprise a unitary structure presenting individual read-write modules aligned to operate along specified tracks of a four-channel magnetic tape (not shown) in a conventional manner. It will be observed from FIGURE 1 that stacking these four read-write potted modules makes it possible to align the gaps 8 of the read-heads, 4*a* through 4*d*, reasonably well; however, since the associated gaps of the write-heads, 6*a* through 6*d*, cannot practically be held in identical spaced relation to associated read-gaps, they will necessarily be "scattered," that is, deviate substantially from alignment along a common axis A—A. It will be understood that the tape medium to be affected by the multi-head recorder 2 of FIGURE 1 will be transported at a prescribed velocity transverse to axis A—A as is conventional. The misalignment of the gaps of write-heads 6*a*–6*d* has been somewhat exaggerated in FIGURE 1, for emphasis. However, in recording systems exhibiting a high pulse packing density, that is, having many characters of information recorded per unit length of the medium, virtually any scattering is fatal. For instance, with a density of 800 characters per inch of magnetic tape, even a small scattering of the write-head gaps will cause intolerable errors. In a typical case, for example, the read-write head gap separations would be selected to be a constant 0.2 inch (plus or minus 0.03 inch tolerance). Even with this small tolerance, however (which is virtually the best that can be achieved), enough scattering commonly occurs to create unsatisfactory, misaligned recordings. The present invention provides an improved delay means for multi-channel transducers, such as write-heads 6*a* through 6*d***, to compensate for such scattering. Thus, it is an object of the invention to provide a delay system for transducers in a multi-transducer array which initiates the operation thereof so as to effect a prescribed operative sequence. Another object of the invention is to provide a delay control for associated recording transducers so as to effectively align the recordings thereof along multi-channel columns.

Compounding the problem of smaller bit-spacing is the presently increasing transport rate for tape and other media. As tape speed increases, for instance, bit-marks are "spread" therealong and, thus, can more likely extend beyond prescribed locations. Thus, with high speed record media, it becomes even more critical to align transducers precisely. The present invention is adapted to meet this problem, especially for high speed tape recorders. The invention allows the alignment of write-head gaps simply by adjusting a control potential while a read-write unit is recording and reading along a particular track. Thus, another object of the invention is to provide an adjustable delay control for high speed multi-track recording systems.

Consideration was given to the provision of passive delay means, that is, using passive impedance elements, to delay the initiating signal for individual heads such as write-heads **6*a*–6*d***, a prescribed time representative of their physical deviation from an alignment reference axis. Of course, such passive delay means such as complex L–C delay lines are known in the art, but being passive, have certain inherent drawbacks, preferably avoided. For instance, passive delay means would characteristically provide only a discontinuous delay control, since by their nature they provide discontinuous increments of signal-delay. The present invention was conceived in part to avoid this problem by providing an active delay means which allows continuous selecting and control for adjusting delay periods with greater convenience and versatility. This is especially important for muti-head recording transducers wherein changes of tape speed and head misalignment will commonly require adjustment from time to time. Where an L–C delay line would require, at best, the mechanical reconnection to different taps, only a voltage-setting need be adjusted with the invention. Thus, another object of the invention is to provide delay means for multi-unit transducer arrangements, providing a continuous delay control therefor.

Another disadvantage with prior art passive delay means is that they cusetomarily require driving voltages and power input which are inconveniently high, especially when used in conjunction with low voltage computer systems. A disadvantage associated with the high power dissipation of passive delays is that their output signal deteriorates to a marked degree as output taps are added. The present invention provides an active delay means requiring relatively low driving voltages and power and thus more apt for use with computer systems. The invention also provides a large selection of delay signals without damaging deterioration thereof.

Another disadvantage associated with the discontinuous control offered by prior art passive delay means is that of crude scaling control. That is, a plurality of passive delay output signals may be simultaneously shifted in value by prescribed related amounts by inserting a scaling passive delay means in series therewith. However, this is usually impractical and provides only one shift-increment. Thus, passive delays are not internally adjustable in scale. It will be recognized that the discontinuous control characteristic of passive delays also means that any scaling which is provided, such as by a second inserted passive delay is also discontinuous. The continuous delay control provided by the present invention also provides a more convenient continuous scaling control and one which is internally adjustable. The invention is, thus, more apt for adjusting delay times of multi-head transducers, for instance, to accommodate a change in tape speed. Thus, it is an object of the present invention to provide a low power delay control for initiating associated output transducers in prescribed delayed manners. Another object is to provide a delay control which may be continuously scaled.

Consideration of known passive delay means, such as the L–C delay lines mentioned above also posed the disadvantages of instability and consequent inaccuracy in the delay means such as is due to reflection echoes, for instance, along known delay lines. Such echoes lead to spurious delay pulses which can interfere with the accuracy and reliability of the output delay signals. A second associated disadvantage of such inductive systems is the possible incidence of feed-back between output transducers when the passive delay means is connected to directly pulse the transducer driver means. The present invention avoids the above disadvantages by providing a delay control which generates its own initiating signals and thus is not susceptible to the instability and inaccuracy of the passive delays. Such passive delay means are somewhat complex and expensive. The active delay means according to the invention is much simpler and less expensive, for instance, costing in one embodiment a fraction of the cost of a comparable passive delay line means. The present invention also provides detector means which are relatively isolated from one another and thus are not affected by feed-back signals between output transducer lines. Thus, another object of the invention is to provide more stable, accurate delay control means, not subject to intradelay pulse reflection and the like. Yet, another object is to provide such a system including detector means associated with the output transducers wherein the detectors are relatively isolated from interfering feed-back and the like.

Still another object is to provide an active delay control means for initiating a plurality of time-related output channels. A still further object is to provide such a control means which is relatively simple using a relatively few components.

Yet, another object of the invention is to provide an improved electronic delay system for recording transducers whereby the transducers may be initiated at times which compensate for mechanical misalignment thereof, to enable them to impress recordings aligned along a single column axis across a multi-track record medium. Still another object is to provide such a system for multi-head magnetic recording transducers whereby the mechanical scattering of head gaps may be compensated for to enable recording of magnetic marks along a straight column across the associated tracks of magnetic tape media.

According to the invention, an enabling signal which would normally be applied to a plurality of associated transducer channels is applied to intermediate active delay means comprising a time-reference voltage generating means, for generating a voltage reference pulse which changes amplitude in a prescribed constant continuous manner with time, and a plurality of voltage-sensitive detector means, one for each transducer channel to initiate an associated transducer upon detection of a prescribed voltage level of the reference pulse. The enabling signal may comprise a "write-time" signal, and the transducer cannels may comprise recording channels, each including a recording transducer and associated driver means in a multi-head recorder unit. The delay means will serve to initiate individual transducers to record on a tape-track at times which result in aligned marks. The reference voltage generating means preferably comprises a ramp voltage generator, i.e. a generator which provides a voltage pulse which increases linearly with time. This ramp voltage generator is preferably applied to detector means comprising a plurality of voltage comparator stages, each stage being adapted to provide an output ("initiate") pulse at a precise delayed time corresponding to a prescribed (preferably adjustable) value of applied ramp voltage. The resulting output signals from the comparator stages may thus be delayed for different periods to gate the activation of respective write transducers at times corresponding to the transit of a prescribed tape-column thereby. By thus delaying the energization of transducers which are misalined "downstream" (i.e. in the direction of tape motion) of a reference axis by delay times corresponding to their degree of misalignment, it is possible, according to the invention, to provide an aligned placement of magnetic "spots" across the width of a tape medium.

The various novel features which characterize the invention are pointed out with particularity in the claims annexed to and forming a part of this specification. For a better undnerstanding of the invention, its advantages and specific objects thereof, reference should be had to the following detailed description of the accompanying drawings, in which:

Figure 1:
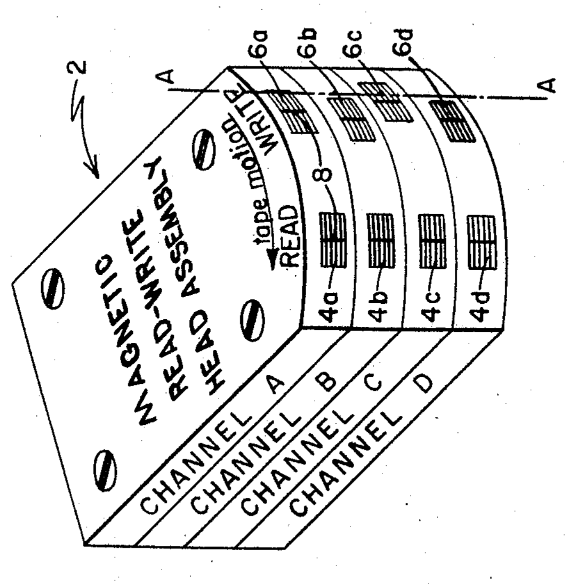
FIGURE 1 is a perspective view of a multi-track magnetic read-write head assembly suitable for control by the present invention.

Referring first to FIGURE 1 of the drawings, there is shown a magnetic read-write head assembly, or recorder 2 having four recording units (Channels A through D) positioned across the face of the assembly to intercept four discrete recording areas, or tracks, across the width of a magnetic tape (not shown). The tape is assumed to move, as indicated, past recorder 2. Each recording channel includes a read-head (4*a*, 4*b*, 4*c*, 4*d*), and an associated write-head (6*a*, 6*b*, 6*c*, 6*d*), each of said heads having a gap portion 8 of prescribed width between head-poles. It will be understood that the gap portion of a write-head determines the size of the record cross-section which intercepts the flux field established by the write-head, or which creates the field intercepted by the read-head.

The gaps 8 of write-heads 6*a*–6*d* are shown as somewhat scattered, i.e. not perfectly aligned along a common reference axis A—A. Axis A—A may be chosen to lie anywhere upstream of the first transducer in order (here head 6*c*), according to direction of tape transit. In FIGURE 1 a reference axis A—A was chosen slightly upstream of initial head 6*c*. Thus, the write-gaps of heads 6*a*, 6*b* and 6*d* are all downstream of 6*c* and will "see" a given tape-column later than head 6*c* and hence must "wait" for a delay-time to record in the same column. As described above, recorder 2 is comprised of stacked read-write transducer modules wherein "companion" transducers (e.g. heads 6*a* and 4*a*) are prespaced, being potted together for convenience, as is common. Thus, while it may be possible to align one set of head-gaps (e.g. those of read-heads 4*a*–4*d*), mechanical tolerances may readily present the others in misalignment (i.e. gaps of 6*a*–6*d*). While the invention is to be explained as related to the above paired-head array of a multi-head magnetic recorder, it will be appreciated that it may be adapted to similarly "delayably" control arrays of single magnetic heads or equivalent time-related output channels, such as card-punching transducers, printing heads and the like.

Figure 2:
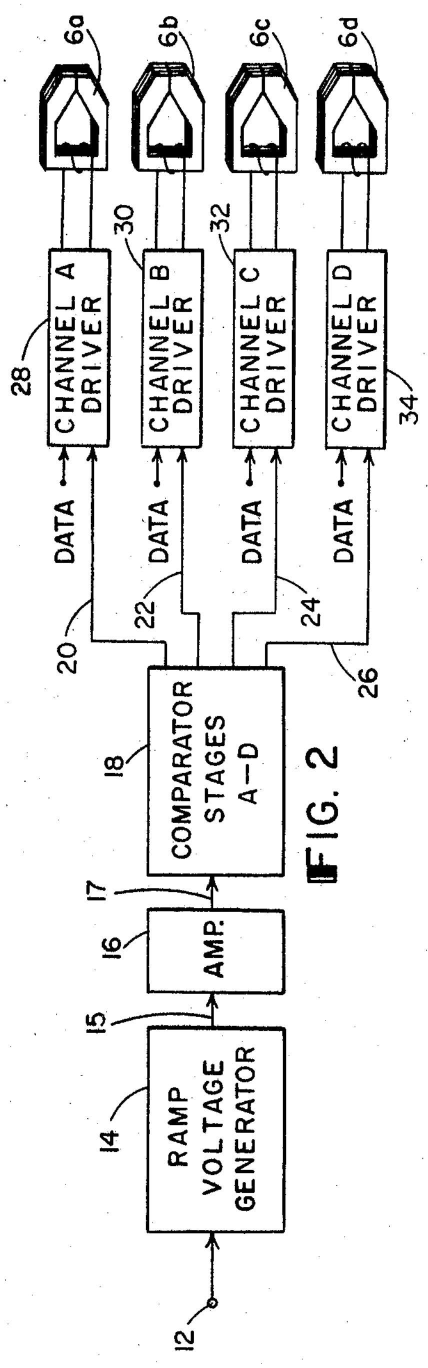
FIGURE 2 is a block diagram representation of a preferred embodiment of a magnetic recording system including misalignment/compensation means according to the present invention.

FIGURE 2 illustrates a block diagram arrangement of the preferred embodiment multi-track magnetic recording system which includes delay means according to the present invention, An input terminal 12 is provided whereby a "write-time" signal may be applied to initiate a ramp voltage generator 14. The linearly increasing voltage waveform provided by the ramp voltage generator 14 (e.g. B in FIGURE 4) is applied to input lead 15 of an amplifier stage 16 which amplifies and isolates the ramp voltage waveform, as indicated below. Amplifier stage 16 applies its output along lead 17 to the inputs of detector (or comparator) stages 18 comprising individual voltage comparators 18A, 18B, 18C, 18D having output leads 20, 22, 24 and 26 respectively. Each of the comparator means is coupled to one of the head-control, or head-driver, stages 28, 30, 32, 34. Each comparator means may be adjusted to provide an output signal initiating an associated head-control to "write" when the rising voltage of the ramp pulse (amplified at amplifier stage 16) exceeds a predetermined "firing" value. This "firing voltage" level may be adjusted as seen below. Since the value of the ramp voltage signal from generator stage 14 is directly related to the time that has elapsed since the occurrence of a "write-time" signal, the output signals from the comparator stages may be delayed by prescribed time intervals which compensate for head misalignment and thus provide character mark alignment across the tape.

The convenience and simplicity offered by this improved multiple-delay control according to the invention is underscored by consideration of a typical write-head alignment procedure for use therewith in the arrangement of FIGURES 1 and 2. An operator can start the tape drive and activate the recording system with any delay bias (as explained below) on the several comparator stages 18*a*–18*d*. Monitoring the output of read-heads 4*a*–4*d* will indicate any misalignment of write-heads since the read-back pulses from the four tracks will be out of synchronism. He may then choose any track and its associated write-head for a reference and synchronize the read-outputs from the other tracks therewith, simply by adjusting each comparator bias potential. Read-output synchronism will indicate proper delay-bias on each write-head comparator, thus compensating for head misalignment, etc. Thus, when it is noted that the binary digits of a character are not properly aligned across the tracks of a multi-channel tape record, it is only necessary, with the described embodiment, to change the voltage setting of the related comparator stage and thereby properly delay the recording times for individual recording channels.

Each of the comparator output leads 20, 22, 24 and 26 is coupled to one input of an associated two-legged head-control stage 28, 30, 32, 34, respectively. As described below, each head-control stage comprises an "ANDing" gate followed by a write drive current generating means, the latter being initiated by the former so as to apply write-current to an associated write-head (6*a*–6*d*). The AND means is adapted to be enabled by the coincidence of a write signal on one leg, together with a (delayed) "write-time" signal on the other leg, the latter emanating from an associated comparator (18*a*–18*d*). Each write-head control stage is thus adapted to provide a current through an associated write-head if and when data and write-time signals are both applied thereto.

Those skilled in the art will recognize that the invention thus provides an improved delay comprising time-reference voltage generator means (ramp voltage generator 14) in combination with voltage-sensitive switching means (comparator stages 18*a*, etc.) to be inserted between a "write-time" signal input and a plurality of associated transducers. It will be evident that this improved delay means can controllably and individually delay the initiation of the transducers. It will be understood that other equivalent time-reference voltage generator means may be employed within the contemplation of the invention, such as means for generating non-linear voltage pulses having a constant time-voltage relation. Similarly, in certain instances, it may be preferable to apply the delayed "write-time" or enabling signals to other time-related, voltage-sensitive asynchronously-operable output channels, such as to multi-track read-heads for compensating for various degrees of known record-skew, to write-heads to compensate for varying arrival times of associated "write" signals to print-hammer actuators for compensating for varying degrees of hammer-response, etc.

Figure 3:
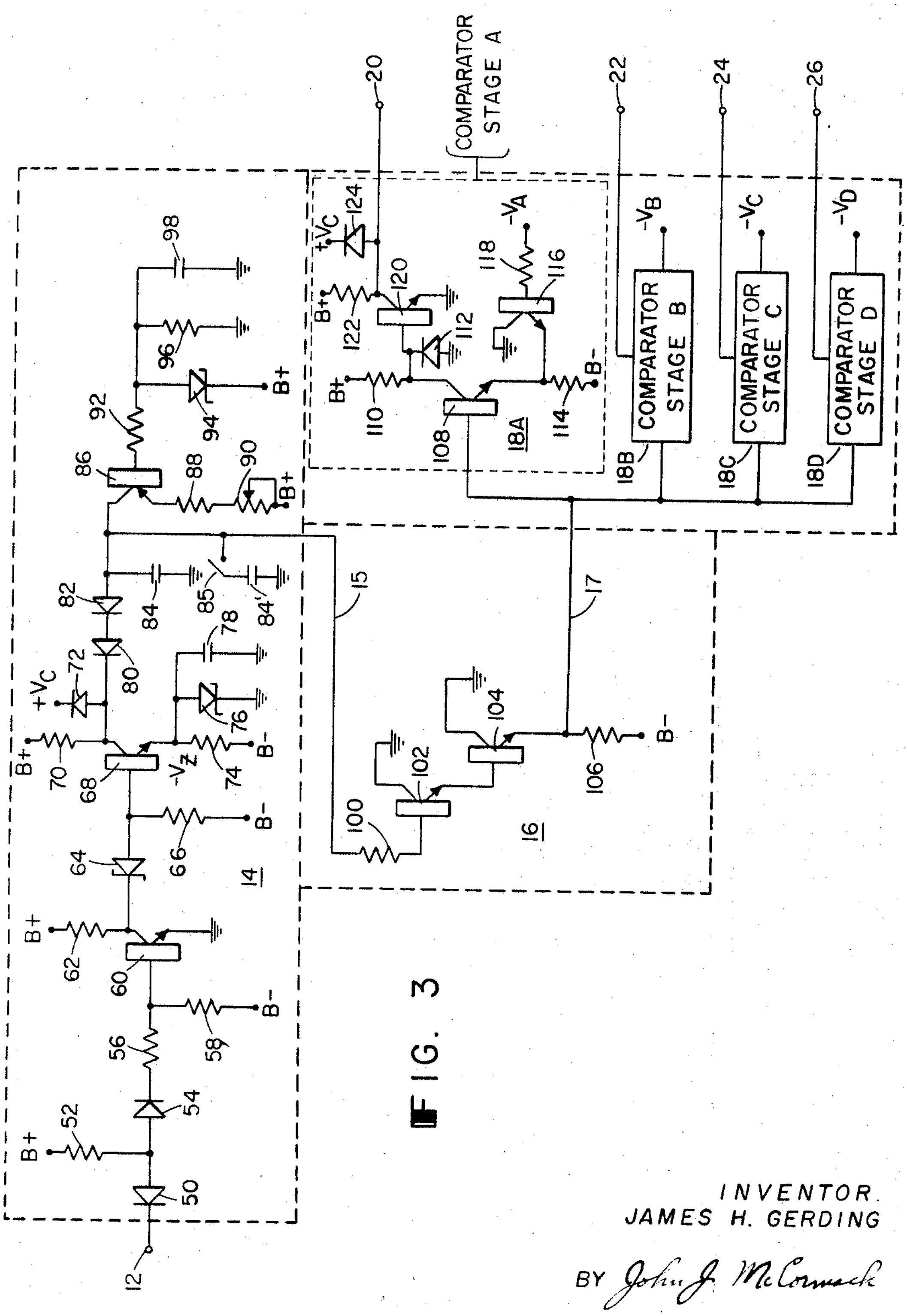
FIGURE 3 is a schematic circuit illustrating a ramp voltage generator, an amplifier stage and comparator stages, according to the invention, adapted for use in the arrangement of FIGURE 2.

The operation of the invention will be better understood by consideration of the following detailed description of the structure and operation of the ramp voltage generator means, the amplifier and the comparator means. FIGURE 3 illustrates in schematic circuit form preferred embodiments of a Ramp Voltage Generator 14, an amplifier 16, and an exemplary Comparator Stage 18*a*, suitable for use in the arrangement of FIGURE 2. The Ramp Voltage Generator 14 will be seen to have the cathode of a gate diode 50 connected to the write-time input terminal 12. The anode of diode 50 is connected to one end of a gate resistor 52 and to the anode of a gate diode 54, resistor 52 having its other end connected to a positive biasing source B+. The cathode of diode 54 is connected to one lead of a level-shifting resistor 56 which has its other lead connected to one lead of a biasing resistor 58 and to the base of a switching transistor 60. The other lead of resistor 58 is connected to a negative biasing source B−. The emitter of transistor 60 is connected to ground while the collector is connected to one end of a collector resistor 62 and to the cathode of a level-shifting Zener diode 64. The other end of resistor 62 is connected to the aforementioned B+ source, while the anode of Zener diode 64 is connected to one lead of a biasing resistor 66 and to the base of a switching transistor 68. The other end of resistor 66 is connected to the aforementioned B− source while the emitter of transistor 68 is connected to the junction between a resistor 74, the anode of a Zener diode 76 and one lead of a filter condenser 78. The free lead of resistor 74 is returned to the aforementioned B− source while the cathode of Zener diode 76 and the other lead of condenser 78 are each connected to ground.

The collector of transistor 68 is connected to one lead of a collector resistor 70, to the cathode of a clamp diode 72 and to the free cathode lead of a series diode combination 80, 82. The other lead of resistor 70 is returned to B+ and the anode of the diode 72 is returned to a positive clamp voltage source $+V_c$. The free anode terminal of the diode 82 is connected to one lead of a filter condenser 84 and to the collector of a constant current transistor 86. The other lead of condenser 84 is connected to ground and the emitter of transistor 86 is coupled to the B+ source via a series connected resistor 88 and an adjustable resistor 90. A normally-open switch 85 is provided to insert condenser 84' in parallel with capacitor 84, as seen below. The base of transistor 86 is coupled by means of the parasitic suppressor resistor 92 to the junction between the anode of a Zener diode 94, one lead of a biasing resistor 96 and one side of a filter condenser 98, the latter two elements being returned to ground. The cathode of Zener diode 94 is returned to the B+ source.

Considering now the operation of the ramp voltage generator described above, prior to the application of a write-time signal applied to the input terminal 12, the transistor switch 60 is maintained in a non-conductive state, this state being established by means of the reverse-biasing potential maintained across the base-emitter junction thereof by the biasing network comprising the B+ source, the resistor 52, the diode 54, the resistor 56, the resistor 58 and the B− source. As long as transistor 60 is in its non-conductive state, the cascaded transistor switch 68 is maintained in its conductive state by means of a forward-biasing potential established across the base-emitter junction thereof by the biasing network comprising the B+ source, the resistor 62, the Zener diode 64, the resistor 66 and the B− source.

It should be noted that the emitter of the transistor 68 is maintained at a fixed, negative, voltage level, hereinafter referred to as $-V_z$ volts, by means of the voltage drop established across the Zener diode 76 by way of the current path which includes the B− source and the resistor 74. Disregarding any small voltage drop which may occur across the collector-emitter junction of the transistor 68 while in its fully conductive state, the collector of transistor 68 will, thus, also assume a value of $-V_z$ volt.

Transistor 86 functions as a constant current source, having a fixed voltage established between its base-emitter junction by means of the forward voltage drop established across the Zener diode 94 and the fixed current thus maintained through its base-emitter junction, the value of which is determined by the values of the resistors 92, 88 and, principally, by the setting of the adjustable resistor 90. The fixed value of current which flows through the emitter-collector junction of transistor 86 will, in the absence of an enabling signal applied to the terminal 12, be routed through the diodes 82 and 80 and through the collector-emitter path of the conducting transistor 68 to the $-V_z$ voltage source. As a result, the condenser 84, connected to the collector of transistor 86, will be charged to a value slightly more positive than $-V_z$ volts due to the small forward voltage drop across the combined diodes 80 and 82. Diodes 80, 82 are provided to compensate for small voltage drops across amplifier stage 16. The function of the diode combination 80, 82 will become apparent in the discussion of the amplifier stage 16 described below.

The operation of the ramp function generator 14 in response to the application of a write-timing signal, such as that shown at waveform A (FIGURE 4), to input terminal 12 is as follows: Application to terminal 12 of this positive-going pulse causes the biasing level established at the base of transistor 60 to become sufficiently positive to switch it to its conductive state. Conduction by transistor 60, in turn, causes the following transistor switch 68 to be made non-conductive. When this occurs, the collector voltage of transistor 68 will change from $-V_z$ volts to a value determined by the clamp voltage $+V_c$ applied to the anode of the diode 72.

As previously mentioned, the transistor 86 and its associated components function as a constant current source which will deliver a constant collector current independent of its collector-load impedance. This current, which, prior to the application of an enabling signal on terminal 12 flowed through transistor 68, will now be routed through the condenser 84, (or, alternatively, condensers 84' and 84) causing the latter to charge at a linear rate from a value of approximately $-V_z$ volts towards B+ potential. The value of the condenser 84 as well as the value of the constant current applied thereto are selected so as to provide a desired rate of output voltage change (ramp voltage slope) and resultant change in delay/voltage dependence. That is, these parameters may be adjusted to select different time delay/output voltage relations. Thus, this arrangement allows selection of different ramp pulse slopes, and thereby change delay/voltage scales, by adjusting the capacitance and/or applied current associated with condenser 84. For instance, switching-in condenser 84' will effect this as will changing the setting of adjustable resistor 90. The ramp voltage provided by the ramp voltage generator is illustrated by the pulse waveform B of FIGURE 4. Thus, pulse B will originate from a $-V_z$ value determined by the emitter bias applied to transistor 68, which may if desired be changed to shift the lower level of the ramp voltage scale accordingly. The upper level of the ramp pulse will be determined by the pulse slope, adjusted as above-indicated and by the duration of the "write-time" pulse (waveform A). The slope of the ramp output pulse (waveform B), i.e. the time-encoded voltage increments represented thereby, may be changed by providing more or less charging current to capacitor 84, such as by adjusting bias resistor 90. The entire delay time scale of ramp wave (B) may be shifted by providing a delay means at the input of ramp generator 14. It is a feature of the invention that, after voltage-switching comparators 18*a* etc., have been set to fire after a prescribed delay time, the insertion of such an input delay means can shift all delay times by equal increments, effectively shifting response-voltages $V_A$, $V_B$, etc., along the time axis by equal amounts. Thus, the invention provides a source of linearly, time-dependent, delay-reference pulses (ramp pulses) initiated by a write-time pulse to provide prediodically occurring voltages for switching a plurality of transducer-enabling means at fixed, adjustable delay periods. These delay-reference pulses are provided, according to the invention, by a ramp voltage generator means comprising capacitive means, adjustable constant current supply means for charging said capacitive means linearly with time and transistor switching means for routing the output from said supply means to said capacitive means. It will be apparent that equivalent means may be provided within the contemplation of the invention.

As noted from the block diagram configuration of FIGURE 2, the output lead of the ramp voltage generator 14 is coupled to an amplifier stage 16. As shown schematically in FIGURE 3, the amplifier stage 16 comprises a pair of amplifying transistors 102 and 104 connected in a compound emitter-follower configuration, whereby the emitter of transistor 102 is directly connected to the base of transistor 104. Each of the transistors 102 and 104 has its collector element connected to ground. The base element of transistor 102 receives the output signal from the ramp voltage generator 14 by way of a series-connected, parasitic suppressor resistor 100. The emitter of transistor 104 is coupled through an emitter resistor 106 to the B− source. Further, an output lead 17 is coupled from the emitter of transistor 104 to the inputs of the comparator stages 18*a* through 18*d*.

The amplifier stage 16 functions in a conventional manner to provide power amplification of the ramp voltage waveform and to isolate the load presented by the comparator stages 18*a* etc. from the ramp voltage generator time-determining components. This especially avoids diverting any of the constant current supplied to timing condensers 84, 84′.

Since each of the comparator stages 18*a*–18*d* are alike in construction and in operation, only one comparator stage 18*a* is shown in schematic detail in FIGURE 3 and described herewith. The output lead 17 from the amplifier stage 16 is coupled to the input of each of the comparator stages 18*a*–18*d*, as for example, to the base of a first comparator, transistor 108. Transistor 108 has its collector connected to the B+ source by way of a bias resistor 110, and to the cathode of a clamp diode 112, the anode of which is connected to ground. The emitter of transistor 108 is connected to B− through an emitter resistor 114 and is also connected to the emitter of a second-comparator transistor 116, the latter having its collector connected to ground. A prescribed value of voltage, such as bias voltage $-V_A$ is coupled to the base of transistor 116 via a parasitic suppressor resistor 118.

A transistor switch 120 has its base connected to the collector of transistor 108. The emitter of transistor 120 is connected to ground, while the collector is connected to the junction between one lead of a bias resistor 122, the anode of a clamp diode 124 and the comparator stage output lead 20. The other lead of resistor 122 is connected to the B+ source, while the cathode of diode of 124 is connected to the aforementioned positive voltage source $+V_c$.

Figure 4:
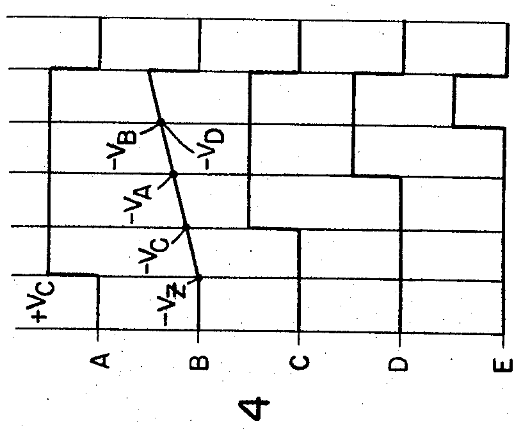
FIGURE 4 illustrates a series of waveforms which are helpful in forming an understanding of the operation according to the present invention of the elements of FIGURE 3.

Considering now the operation of exemplary comparator stage 18*a*, the voltage $-V_A$ applied thereto is selected to be more positive than the quiescent voltage level established at the base of transistor 108. Therefore, transistor 116 will be normally conducting and transistor 108 will be normally cut-off. During the time period that transistor 108 is maintained cut-off, the positive voltage established at its collector will cause transistor switch 120 to be held conductive, thus holding its collector, and output lead 20, at ground potential. After the initiation of the ramp voltage output pulse, the aforementioned conductive condition of the comparator transistors will exist until such time as the ramp pulse attains a voltage which is more positive than the reference voltage $-V_A$. At this time, transistor 116 will be made non-conductive, while transistor 108 will start to conduct. When this occurs, the collector voltage of transistor 108 goes negative and is clamped at ground potential by the action of clamp diode 112. The negative voltage, which is then applied at the base of transistor switch 120 will cause the latter to become non-conductive, thus permitting its collector to go positive to the clamp voltage $+V_c$. A positive-going output pulse (e.g. waveform D, FIGURE 4) will then be generated at output terminal 20. Such an output pulse will emanate from each comparator means, 18*a*–18*d* when the biasing voltage thereof (e.g. $-V_A$ through $-V_D$) has been exceeded by the rising ramp voltage. This output time will represent a prescribed delay after occurrence of the write-timing signal (waveform A) as shown in FIGURE 4 (waveforms C, D, E). This voltage may be adjustable so that as the reference voltage (e.g. $-V_A$) is made more positive (e.g. $-V_B$), the output pulse from the comparator stage will be further delayed (e.g. waveform E). Thus, such is indicated by the waveforms D and E in FIGURE 4, representing the initiation of a delayed write-timing pulse to occur when the ramp voltage reaches the values $-V_A$ and $-V_B$, $-V_D$ respectively.

Thus, it will be recognized that an adjustable, voltage-sensitive switching means is provided by comparator stages 18*a*, etc. whereby the output pulse from a reference-voltage generator, such as from ramp voltage generator 14, may be used to trigger associated output devices, such as multi-track transducers, at different delay-times. It will be recognized that comparator circuit 18*a* provides a simple, reliable means for this, including a pair of voltage-comparing transistors adapted to trigger an output pulse device upon the incidence of input signals above a prescribed adjustable bias voltage. It will be appreciated that comparator switch 18*a*, being responsive to continuously variable bias (or reference) voltages provides a simple continuously adjustable delay means.

In summary, the present invention provides a reliable means for electronically compensating for misalignment of write transducers associated with a multi-track recorder means. No limit is placed upon the number or value of delay increments available, there being an infinite number of delay periods made available by the simple adjustment of comparator reference voltages for a particular placement of the transducers. It will be appreciated that the prescribed head alignment dictated by the control delay means need not be transverse or even orthogonal with respect to tape tracks; for instance, it may dictate a skewed, oblique alignment of associated record-marks.

It has been stated that a multiple-delay control according to the invention may also be used to "delayably" control time-related output channels other than the above-mentioned magnetic recording transducer channels; voltage-sensitive means being provided to activate each channel at a delay time corresponding to rise of the reference pulse above a prescribed voltage. Thus, a reference-pulse generating means will be provided to generate, upon receipt of a "start," or timing signal, a series of increasing voltages, encoded to represent constant prescribed delay periods after said signal. The reference pulse thus impresses a spectrum of delay-encoded voltages upon a plurality of voltage-sensitive output channels. It was also pointed out that the switching or comparator means may each include an output lead that is fixedly connected to a particular channel (i.e. transducer means) to enable the latter at a prescribed delay-time. However, it will be appreciated that switching stages may be conserved by connecting a single switching means to a plurality of such channels to delay their activation by a similar period. Moreover, while the switching output leads were shown as fixed and the bias potential variable, it will be appreciated that either may be fixed or variable according to the invention. In some cases, it may be preferred to tie each switching means to a different fixed bias potential (preset delay periods) and make the coupling thereof to one or several transducer channels variable. The latter arrangement would be apt for multi-use delay-control units to be readily adapted to different multi-channel devices, such as different multi-head recorders.

It will be apparent from the foregoing disclosure of the preferred embodiment of the present invention that numerous modifications, changes and equivalents will now occur to those skilled in the art, all of which fall within the true spirit and scope contemplated by the preferred embodiment of the invention, and by the following claims.

What is claimed is:

1. In an alignment system for aligning record marks along parallel record axes across a relatively movable multi-channel record medium, said marks being impressed in response to the occurrence of prescribed starting signals by a plurality of associated recording transducer means, said transducer means each being adapted to impress certain of said marks along a prescribed head-axis in response to receipt of enabling signals, said system comprising:

ramp pulse generating means having input and output terminals, and ramp pulse generating means being adapted to emit reference pulses in response to application of said starting signals on said input terminal, said reference pulses having voltage levels which increase linearly with time; and a plurality of voltage-sensitive switching means, each being connected between said output terminal and one of said transducer means and adapted to impress such enabling signals upon said transducer means to enable the latter, at times determined by a prescribed voltage level of said reference pulses and corresponding to a prescribed delay-time to provide marks which are aligned along said record axes.

2. The system recited in claim 1 wherein said switching means comprise voltage comparator circuits including a pair of substantially identical, exclusively conducting transistors.

3. The system recited in claim 1 wherein said pulse generating means comprises capacitive means, charging means and switching means, said switching means connecting said capacitive and said charging means and adapted to enable said charging means to linearly charge said capacitive means upon receipt of said starting signals.

4. A multiple delay system for providing reference pulses exhibiting a spectrum of delay-encoded voltages in response to receipt of prescribed timing signals, said system being arranged to impress said pulses, so encoded, upon a plurality of voltage-sensitive, time-associated output channels, each channel being adapted to be activated upon detection of a prescribed voltage level of said reference pulses, said level being representative of a prescribed delay-period after the initiation of said timing signals, said system comprising reference pulse generating means adapted to emit said pulses, the voltage of which rises in a constant prescribed manner with time, said generating means including input means arranged to receive said timing signals and output means arranged to be coupled to said channels.

5. A multiple delay system for providing selectably-delayed enabling signals at a plurality of associated time-related output means in response to input timing signals, said system comprising:

reference pulse generating means for emitting reference pulses in response to the receipt of said timing signals, the voltage of said pulses varying in a prescribed, linear manner with time, said generating means having input means arranged to receive said timing signals; and a plurality of voltage-sensitive switching means connected between said generating means and ones of said output means, said switching means being adapted to emit said enabling signals at prescribed delay times corresponding to selectable delay-encoded voltage levels of said reference pulses.

6. The delay system recited in claim 5 wherein said reference pulse generating means comprises timing condenser means, a constant current source connected to said condenser means, and switch means coupled in shunt with said condenser means and being normally adapted to divert the current from said constant current source from flowing through said condenser means, said switch means being connected to said input means and adapted to respond to said timing signals so as to permit the current from said source to flow through said condenser means.

7. The delay system recited in claim 5 wherein aid switching means comprise first and second transistors, each having a base, an emitter and a collector, means for coupling the base of said first transistor to said generating means, means for applying a reference voltage to the base of said second transistor, a common emitter resistor, a first biasing source, said first and second transistors each having their emitter lead connected to one lead of said common emitter resistor, said emitter resistor being, in turn, connected to said first biasing source, a second biasing source, resistive means coupling the collector of said first transistor to said second biasing source, a reference potential, means connecting the collector of said second transistor to said reference potential, and means for coupling the collector of said first transistor to at least one of said output means.

8. In an improved transducer control system wherein a timing signal is applied from a terminal to a plurality of space-related transducer means to initiate operation thereof, said system being improved by the combination therewith of selectable delay signal generating means inserted between said terminal and said transducer means, said generating means comprising: a ramp voltage generating means coupled to said terminal to be initiated by said signal to emit reference ramp pulses, and a plurality of voltage-sensitive switching means each being connectable between said generating means and at least one of said transducer means and adapted to apply an output signal to initiate said associated transducer means at delay times variably corresponding to the time-of-occurrence of prescribed voltages of said ramp pulses.

9. A multi-channel recording system activated by prescribed timing signals, said system comprising: a plurality of transducers, a plurality of switching stages, each having an input terminal, a bias terminal, and an output terminal, bias means for providing bias voltages of a prescribed value at said bias terminals, reference pulse generating means adapted to generate reference pulses in response to said timing signals, the voltage of said pulses changing linearly with time, means for applying said reference pulses to said input terminals of each of said switching stages, each of said switching stages being adapted to provide a prescribed initiate-signal at said output terminal thereof when the voltage level of said reference pulses exceeds the value of said bias voltage, and means for coupling at least one of said output terminals to at least one of said plurality of transducers.

10. A multi-track recording system for impressing a recording upon relatively movable media, said system having:

a plurality of recording transducer means, a like plurality of switching stages each having a first and a second input terminal and an output terminal, reference ramp pulse generating means having an output portion connected to said first input terminals and an input portion adapted to receive said timing signals, means for applying prescribed values of reference voltage to the second input terminal of each of said switching stages, each of said switching stages being adapted to provide an output signal at said output terminal thereof when the voltage value of the ramp pulse output of said generating means exceeds the associated value of said reference voltage, and means for coupling the output terminal of at least one of said switching stages to said plurality of recording transducer means to activate the latter.

11. A multi-track magnetic tape recording system for recording on a relatively movable tape medium, said system comprising: write-time signal supply means, a plurality of transducer channels including input terminals and magnetic head means, each channel being adapted to be enabled by receipt of prescribed enabling signals on said terminal whereby said associated head means is energized to record along a head axis on said medium, said head axes being subject to misalignment from a prescribed common reference axis, ramp voltage pulse generator means arranged to be energized by timing signals from said supply means so as to emit reference pulses at the output thereof, said pulses having rising voltage values with a constant prescribed relation to delay times after receipt of said signals; and a plurality of voltage-responsive switching means adapted to emit enabling signals for enabling said channels in response to a prescribed adjustable input voltage impressed thereon, each of said switching means being connected between the output of said generator means and one of said channels.

12. A multiple channel magnetic tape recording system for impressing magnetic recordings along prescribed tracks of a movable magnetic medium in response to the receipt of write-timing signals and data signals, said system comprising: a plurality of recording transducer heads each positioned to record along a different one of said tracks, each of said heads having a gap portion aligned along a gap-axis transverse said tracks, said gap-axes intended to be substantially aligned along a common column-axis; a plurality of head control means for activating said heads upon coincident receipt of one of said data signals and one of said timing signals, one of said control means being provided for each of said heads, a ramp voltage generating means having an input terminal and an output terminal, said generating means being adapted upon receipt of one of said write-timing signals to generate a reference pulse having a voltage which increases linearly with respect to time, a plurality of voltage comparator stages, each having first and second IN terminals and an OUT terminal, means for coupling said output terminal of said ramp voltage generating means to said first IN terminal of each of said comparator stages, means for applying prescribed bias voltages to said second IN terminal of said comparator stages, each of said comparator stages being adapted to provide a delayed, write-timing pulse at the said OUT terminal thereof when the value of said ramp reference pulse voltage exceeds the value of said bias voltage applied to its associated second IN terminal, and means for coupling the OUT terminal of each of said comparator stages to one of said plurality of head control means whereby the latter may be initiated to cause its associated head to record at a prescribed delay-time after receipt of said timing signals, said delay-time corresponding to the time for tape transit from said column-axis to the associated gap-axis of said head.

13. The recording system of claim 12 wherein said generating means comprises timing condenser means, a constant current source connected to said condenser means, switch means coupled in shunt with said condenser means and being normally adapted to divert the current from said constant current source from flowing through said condenser means, input means connected between said switch means and said input terminal, said switch means being adapted in response to said write-timing signals at said input terminal to permit the current from said source to flow through said condenser means, and means coupling said condenser means to said output terminal.

14. The recording system of claim 13 wherein said comparator stages comprise first and second transistors each having a base, an emitter and a collector, means for coupling the base of said first and second transistors to said first and second IN terminals respectively, a common emitter resistor, a first biasing source coupled to said resistor, said first and second transistors each having its emitter lead connected to said common emitter resistor, a second biasing source, resistive means coupling the collector of said first transistor to said second biasing source, a reference potential, means connecting the collector of said second transistor to said reference potential, and means for coupling the collector of said first transistor to said OUT terminal.

References Cited

UNITED STATES PATENTS

| | | | |
|---|---|---|---|
| 2,937,366 | 5/1960 | Sims | 340—174.1 |
| 2,991,452 | 7/1961 | Welsh | 340—174.1 |
| 3,263,223 | 7/1966 | Zenzefilis | 340—174.1 |
| 3,325,794 | 6/1967 | Jenkins | 340—174.1 |
| 3,327,299 | 6/1967, | Johnson | 340—174.1 |

BERNARD KONICK, *Primary Examiner.*

V. P. CANNEY, *Assistant Examiner.*

U.S. Cl. X.R.

179—100.2; 333—29; 346—74